United States Patent [19]

Wachter

[11] Patent Number: 4,704,247

[45] Date of Patent: Nov. 3, 1987

[54] METHOD AND APPARATUS FOR COMPACTING SPENT NUCLEAR REACTOR FUEL RODS

[75] Inventor: William J. Wachter, Wexford, Pa.

[73] Assignee: U.S. Tool & Die Co., Inc., Allison Park, Pa.

[21] Appl. No.: 642,342

[22] Filed: Aug. 20, 1984

Related U.S. Application Data

[62] Division of Ser. No. 291,230, Aug. 10, 1981.

[51] Int. Cl.⁴ .................. G21C 19/10; G21C 19/32
[52] U.S. Cl. ................................................. 376/261
[58] Field of Search ................ 376/272, 260, 261; 252/633, 627; 250/506.1, 507.1; 29/426.2, 426.3, 419 R

[56] References Cited

U.S. PATENT DOCUMENTS

| | | | |
|---|---|---|---|
| 2,995,504 | 8/1961 | Taylor | 376/261 |
| 4,441,242 | 4/1984 | Hicken et al. | 376/261 |
| 4,457,888 | 7/1984 | Vickrey, Jr. | 376/272 |
| 4,547,117 | 10/1985 | Shields et al. | 376/272 |

FOREIGN PATENT DOCUMENTS

| | | | |
|---|---|---|---|
| 0043096 | 1/1982 | European Pat. Off. | 376/272 |
| 2900865 | 7/1979 | Fed. Rep. of Germany | 376/261 |
| 3222822 | 12/1983 | Fed. Rep. of Germany | 376/272 |
| 0004454 | 12/1983 | PCT Int'l Appl. | 376/261 |

Primary Examiner—Deborah L. Kyle
Assistant Examiner—Daniel Wasil
Attorney, Agent, or Firm—Clifford A. Poff; Thomas H. Murray

[57] ABSTRACT

A method and apparatus for withdrawing spent fuel rods from a nuclear fuel rod assembly into a different nuclear fuel rod container wherein the spent fuel rods have a higher fuel rod density, whereby a greater number of spent fuel rods can be stored in a water storage pool. The individual rods are drawn upwardly through a transition funnel from the fuel rod assembly into a fuel rod container. Individual wires extend through the fuel rod container, through the transition funnel and are secured to the top ends of the individual fuel rods within a fuel rod assembly. All of the fuel rods are withdrawn concurrently and are merged toward one another into a tighter array within the fuel rod container.

6 Claims, 5 Drawing Figures

U.S. Patent  Nov. 3, 1987  Sheet 1 of 2  4,704,247

METHOD AND APPARATUS FOR COMPACTING SPENT NUCLEAR REACTOR FUEL RODS

This is a division of application Ser. No. 291,230, filed Aug. 10, 1981.

FIELD OF THE INVENTION

This invention relates to a method and apparatus for compacting spent nuclear reactor fuel rods and more particularly for preparing such spent fuel rods for long-term water pool storage.

STATEMENT OF THE PRIOR ART

Nuclear reactor installations employ nuclear fuel materials in the form of fuel rods which are supported in fuel rod assemblies. The fuel rods are metal pipes which are filled with nuclear fuel material and are about 0.4-0.6 inch in diameter and from 8 to 15 feet in length. Groups of 64, 128 or more such fuel rods are assembled in a fuel rod assembly which includes grids for alignment and support of the fuel rods, lower end fitting, upper end fitting, and guide tubes. The fuel rod assembly is introduced into a nuclear reactor as the fuel source. After the nuclear fuel in the fuel rod assembly is spent to a pre-established level, the entire fuel rod assembly is withdrawn from the nuclear reactor and is stored vertically in appropriate metal racks in a wet pool until the radioactive properties have dissipated sufficiently for transfer to other storage locations.

Within the fuel rod assembly, the individual fuel rods are spaced-apart in a pre-established array, usually a rectangular array. The fuel rods are spaced-apart in the array and are maintained under water in the reactor for the purpose of moderating or slowing the neutrons. In the fuel rod assembly, the ratio of cross-sectional area of fuel rod to cross-sectional area of water is approximately 1:1.

At the present time, spent nuclear fuel rod assemblies are withdrawn from the nuclear reactors and are stored vertically in appropriate storage racks under water in storage pools without any deliberate change in the fuel rod assembly. The fuel rod storage pools are filling with the spent fuel rod assemblies whose activity has dissipated as a result of extended storage in the pool.

A number of suggestions have been made for removing long-term storage fuel rod assemblies from the pool and for withdrawing individual spent fuel rods from the fuel rod assembly and thereafter for assembling the individual spent fuel rods in new containers or canisters wherein the fuel rods are more closely aligned, i.e., more densely compacted, and for returning such newly filled canisters to appropriate storage racks within a water storage pool for long-term storage or until appropriate fuel recovery processing is economically feasible.

None of these compacting processes have been carried out except with simulated fuel rod assemblies containing simulated fuel rods. Some of the anticipated difficulties with the proposed fuel rod compacting processes which have been suggested arise from the knowledge that the actual fuel rods are twisted and bent out of alignment as a result of their long-term exposure in nuclear reactors. In some cases, the distortion may be as much as 1.5 inches in an 8-foot long rod. Such permanent distortion of the fuel rods will interfere with the proposed alignment techniques.

A further problem is that the long, thin fuel rods are whippy and may be difficult to manipulate.

A still further problem relates to the inherent safety of compacting spent fuel rods. There is a possibility that the fuel rods might become spaced-apart by a critical distance while removed from the fuel rod assembly and before compaction and confinement in a storage canister. Such possibility should be precluded.

At the present time there is a need to compact spent fuel rods which are contained in wet storage pools in the fuel rod assemblies.

STATEMENT OF THE INVENTION

According to the present invention, a method and related apparatus are proposed for transferring spent fuel rods from a fuel rod assembly in an underwater pool directly into a fuel rod canister where the density of the fuel rods greatly exceeds the fuel rod density in the fuel rod assembly. As a result of the present invention, the spent fuel storage capacity in a particular water storage pool can be approximately doubled.

According to the invention, the top end of a fuel rod assembly is removed, by cutting or otherwise, and the exposed fuel rod tops are individually connected to individual pulling elements such as wires or other tensioning devices. The wires are presented in an array which corresponds to the array of the individual fuel rods. The wires are drawn through a fuel pin directing chamber such as a transition funnel which has a relatively wide cross-section at its base corresponding to the array of the tops of the fuel rods in the fuel rod assembly. The transition funnel at its top end has a relatively narrow cross-section which corresponds to an array of fuel rods in a compact storage presentation. For each individual wire there is a separate guide within the transition funnel for directing the wire and its associated fuel rod upwardly from the fuel rod assembly through the transition funnel into a permanent storage container which is positioned above the top of the transition funnel. The wires pass downwardly through the container, through the transition funnel, and are connected at their upper ends to a tensioning device such as a reeling drum to permit pulling the wire and its associated fuel rod upwardly out of the fuel rod assembly into a selected one of the passageways through the transition funnel and thence into a pre-established position in a compacted array of fuel rods within the container.

Connection means are provided at the bottom end of each wire for securing one fuel rod. A preferred connection means is a helical tension sleeve gripper which has its upper end secured permanently to the lower end of a wire and has an open sleeve depending downwardly which can be fitted over the top end of a fuel rod to provide a tension connection which is easily established and easily terminated.

Preferably the individual fuel rods are withdrawn upwardly concurrently from the common fuel rod assembly so that the upper ends of all of the fuel rods enter into the container at about the same level to facilitate stacking within the container. Preferably, within the container, the array of spent fuel rods is an equilateral triangular array which provides maximum fuel rod density in the container. Preferably the fuel rod density in the container is approximately twice that of the fuel rod density in the fuel rod assembly.

The transition funnel is so arranged that the tubes merge toward one another. As a consequence, the fuel rods, in passing from the fuel rod assembly into the fuel rod container, do not move apart so that critical distances between fuel rods cannot occur.

By providing fuel rod containers of the same cross-section dimensions as the fuel rod assemblies, the containers can be stored in the same underwater fuel rod storage racks which have been employed for the fuel rod assemblies. When the present invention is practiced accordingly, the capacity of the fuel rod storage pools for spent nuclear fuel rods can be approximately doubled.

The structural components of the empty fuel rod assembly are collected and stored for appropriate disposal.

Accordingly, it is an object of this invention to provide a method for transferring spent fuel rods from a fuel rod assembly directly into a compact fuel rod container for compact storage of the spent fuel rods.

It is a further object of this invention to carry out the described method without extracting the fuel rods above the surface of the water in the fuel rod storage pool.

DESCRIPTION OF THE PREFERRED EMBODIMENTS

Figure 1:
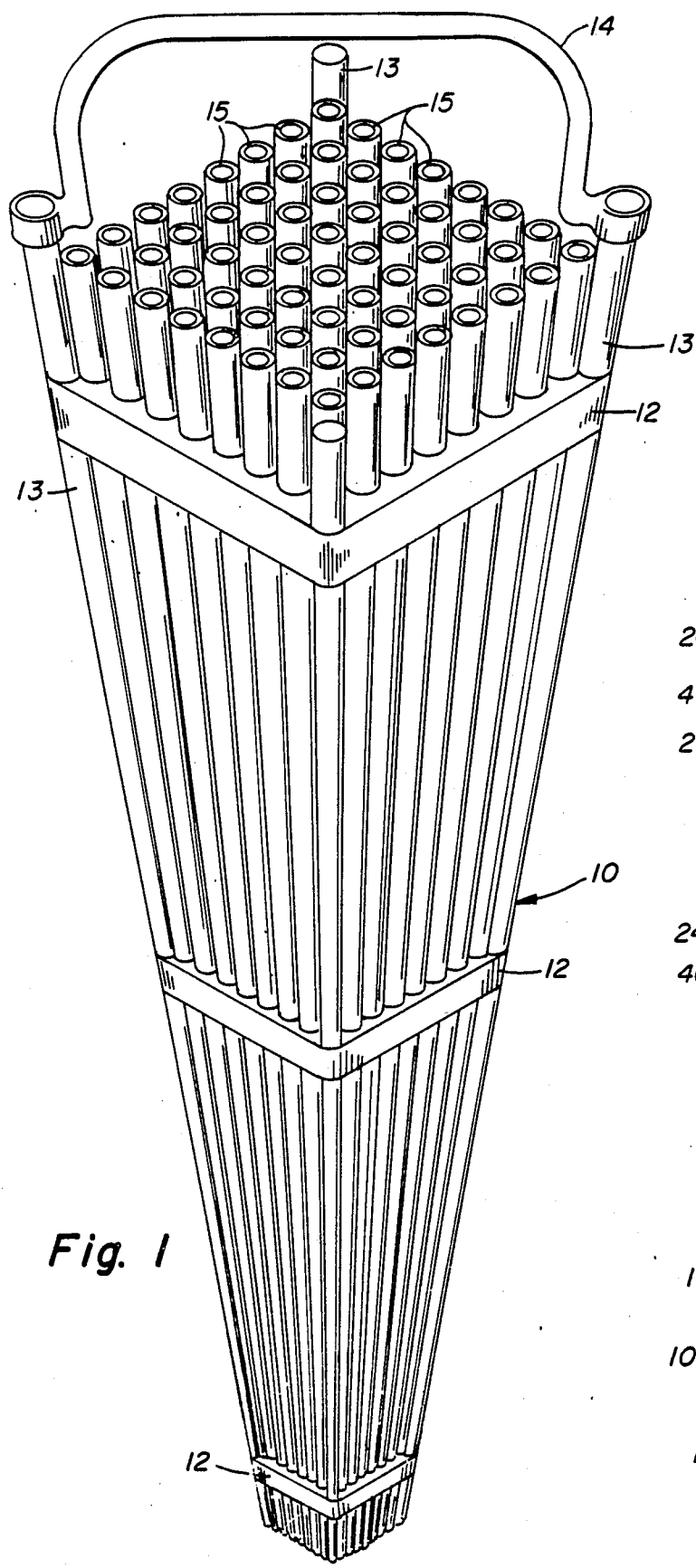
FIG. 1 is a perspective illustration of a typical fuel rod assembly.

Referring to FIG. 1, a typical fuel rod assembly 10 includes individual fuel rods 11 (64 rods are shown in FIG. 1), guide rods 13 and a handle member 14. The individual fuel rods (also called fuel pins) 11 are about 0.4–0.6 inch in diameter and about eight feet long in one type of nuclear reactor installation, about 15 feet long in another type of nuclear reactor installation. The fuel rod assembly 10 is withdrawn from a nuclear reactor after the nuclear fuel within the fuel rods 11 has been spent. Thereafter, the fuel rod assembly 10 is stored in appropriate storage racks under water in storage pools until its activity is dissipated.

The purpose of the present invention is to compact the fuel rods 11 after their activity has dissipated and to store the fuel rods in a new and different container wherein their spacing is altered.

Figure 2:
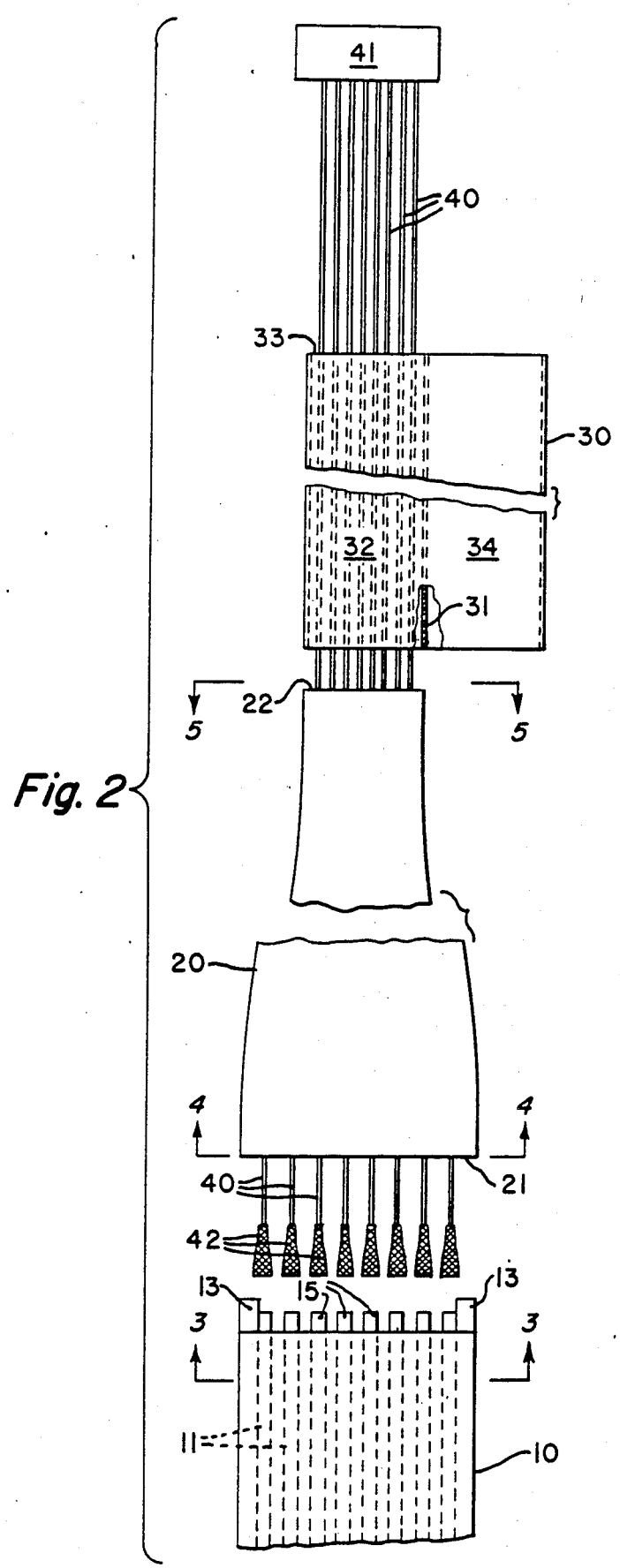
FIG. 2 is a broken, side elevation view of a fuel rod assembly, a transition funnel, a container and a tensioning device illustrating the present method of apparatus.

As shown in FIG. 2, a fuel rod assembly 10 initially has its upper end removed so that the top ends 15 of the individual fuel rods 11 are exposed. The top end is removed by cutting or otherwise. One way of removing the top end is to cut the top elements with an air-powered underwater band saw. In some fuel rod assemblies, the top end may be dismantled by removing the bolts or other devices which connect it to the main frame. After the top end of the assembly is removed, the top ends 15 of the individual fuel rods 11 are exposed as shown in FIG. 2.

Figure 3:
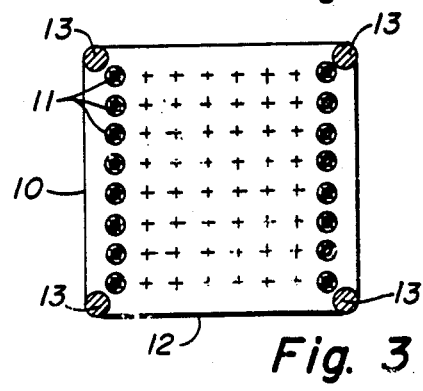
FIG. 3 is a cross-sectional view taken along the line 3—3 of FIG. 2.

FIG. 3 is a cross-section view taken along the line 3-3 of FIG. 2 showing the spacing pattern (array) of the fuel rods 11 within the fuel rod assembly 10.

Figure 4:
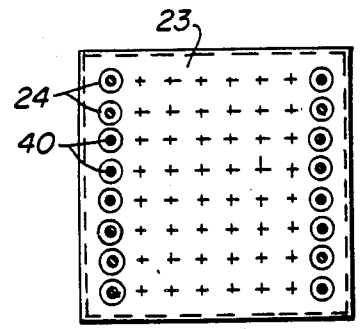

Placed in tandem with fuel rod assembly 10 is a transition funnel 20 which has a lower end 21 and an upper end 22. The lower end 21 is shown in a plan view in FIG. 4 as a generally square grid corresponding to the cross-section of the fuel rods 11, as shown in FIG. 3.

Figure 5:
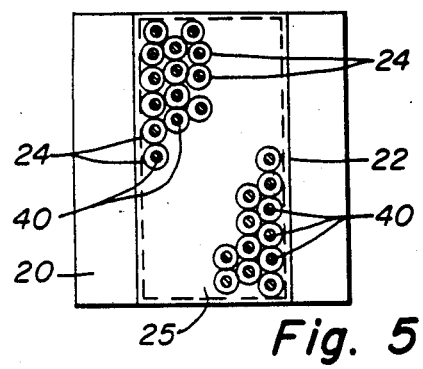
FIGS. 4 and 5 are plan views of the bottom end and top end, respectively, of a transition funnel 20 of FIG. 2.

The lower end 21 is a grid 23 having openings for individual tubes 24 corresponding in number and array with the top ends 15 of the fuel rods. The transition funnel tapers from its lower end 21 toward its upper end 22. At the upper end 22, the transition funnel 20 has a plan view as shown in FIG. 5 having a grid 25 with openings for receiving the top ends of the tubes 24 in a desired array.

It will be observed that the array of the tube openings 24 in the grid 25 is equilateral triangular—a preferred array.

Above the transition funnel 20 is a container 30 having outer dimensions corresponding to the outer dimensions of the fuel rod assembly 10. The container 30 preferably is a metal rectangular box having a length slightly greater than the length of the fuel rods 11 and having sufficient cross-sectional area to receive the compacted fuel rods from a fuel rod assembly 10 in approximately half of its cross-sectional area. In one embodiment, a vertical baffle 31 may be provided to divide the container 30 into parallel chambers 32, 34. All of the fuel rods 11 from a fuel rod assembly 10 can be confined in the chamber 32 as shown in FIG. 2. All of the fuel rods from another fuel rod assembly can be confined in the chamber 34.

Extending downwardly through the container 30 are a number of individual wires 40 corresponding to the number of fuel rods 11 in the fuel rod assembly 10. The individual wires 40 are connected at their upper end to a tensioning device 41 such as a tensioning reel or individual tensioning reels for each wire 40 or for groups of wires 40. The wires 40 extend through the chamber 32 and enter, one each, into one of the tubes 24 within the transition funnel 20. Each of the wires 40 extends through the grid 23 at the bottom of the transition funnel 20 and terminates in a fuel rod gripping device 42. The fuel rod gripping devices preferably are helical sleeve tension grippers which are secured at their upper ends to the wires 40 and which at their lower ends depend as a sleeve which can be engaged with the top end 15 of an individual fuel rod 11.

The operator, employing remote control devices, connects each of the fuel rod gripping devices 42 to a corresponding fuel rod upper end 15. After all of the devices 42 have been connected, the tensioning device 41 is activated and the wires 40 are drawn upwardly through the transition funnel 20 and the chamber 32. Each of the fuel rods 11 is withdrawn from the fuel rod assembly 10 upwardly through an individual tube 24 such that portions of the fuel rods reside in both the fuel rod assembly 10 and the fuel rod directing chamber 12, and, later, in both the fuel rod directing chamber 12 and the container 30 and into an altered array, preferably an equilateral triangular array as shown in FIG. 5. The fuel rods 11 preferably are drawn at a rate such that their upper ends 15 enter into the chamber 32 concurrently and whereby the compacted nesting of the fuel rods 11 is readily achieved within the chamber 32.

The tension on each fuel rod required for withdrawal is from about 20 to 200 pounds.

After the wires 40 have been withdrawn to the top 33 of the container 30, the individual gripping elements 42 are separated from the fuel rods 11. The chamber 32 is thereafter filled with fuel rods in a compact array.

The fuel rod assembly 10 no longer contains fuel rods 11 and can be withdrawn from the water pool for storage and ultimate disposal in an appropriate fashion.

The container 30 is subsequently advanced to another fuel rod assembly along with the transition funnel 20. The wires 40 are introduced through the alternate chamber 34 and the transition funnel 20. The process is repeated and the alternate chamber 34 is filled with fuel rods.

The container 30, holding fuel rods in a compacted array, can be stored under water in the water storage pool in the same type storage rack which formerly housed the fuel rod assembly 10. The storage capacity of a water storage pool can be nearly doubled by practicing this method.

The precise construction of the transition funnel 20 is such that the tubes 24 merge from the lower end 21 to the upper end 22. As the fuel rods are drawn upwardly through the tubes 24, the fuel rods cannot increase their rod-to-rod spacing but, instead, are merged into an ever-increasing density whereby the reactivity of the array is continuously reduced. Thus the possibility of developing a critical spacing of the fuel rods is precluded throughout the controlled densifying operation.

I claim:

1. Apparatus in combination with a fuel rod assembly containing nuclear fuel rods therein for compacting nuclear fuel rods in a fuel rod assembly for storage in a fuel rod storage canister, said apparatus including a fuel rod storage canister for storing compacted nuclear fuel rods, a fuel rod directing chamber having an entrance end defining a plurality of spaced apart openings for alignment with nuclear fuel rods of a first array of nuclear fuel rods in a fuel rod assembly, the spacing between fuel rods in the plurality of spaced apart openings ever decreasing from the entrance end of the fuel rod directing chamber to a discharge end thereof for merging by ever increasing the density of the fuel rods while moving through the directing chamber to the discharge end of said chamber, nuclear fuel rods emerging from the discharge end of said directing chamber forming a compacted second array of nuclear fuel rods for storage in said storage canister, and means to discharge nuclear fuel rods in the direction of their lengths from the fuel rod assembly, said fuel rod directing chamber being arranged in a tandem relation between said fuel rod assembly and said storage canister for confining a given nuclear fuel rod so that portions reside in said fuel rod assembly and said fuel rod directing chamber, and said storage canister and said fuel rod directing chamber while advanced by said means in the direction of the length thereof into said storage canister.

2. The apparatus according to claim 1 wherein said means to discharge nuclear fuel rods include gripper number to engage said nuclear fuel rods of said fuel assembly.

3. The apparatus according to claim 1 wherein said fuel rod directing chamber includes spaced apart end walls connected by tapered side walls.

4. The apparatus according to claim 1 wherein each of the said openings at the entrance end of said fuel rod directing chamber is joined to an opening in said discharge end by means of a tube.

5. The apparatus according to claim 4 wherein each said tube merges toward others of the said tubes from said entrance end to said discharge end of said fuel rod directing chamber.

6. The apparatus according to claim 1 wherein the said compacted second array is an equilateral triangular array.

* * * * *